Figure 1:
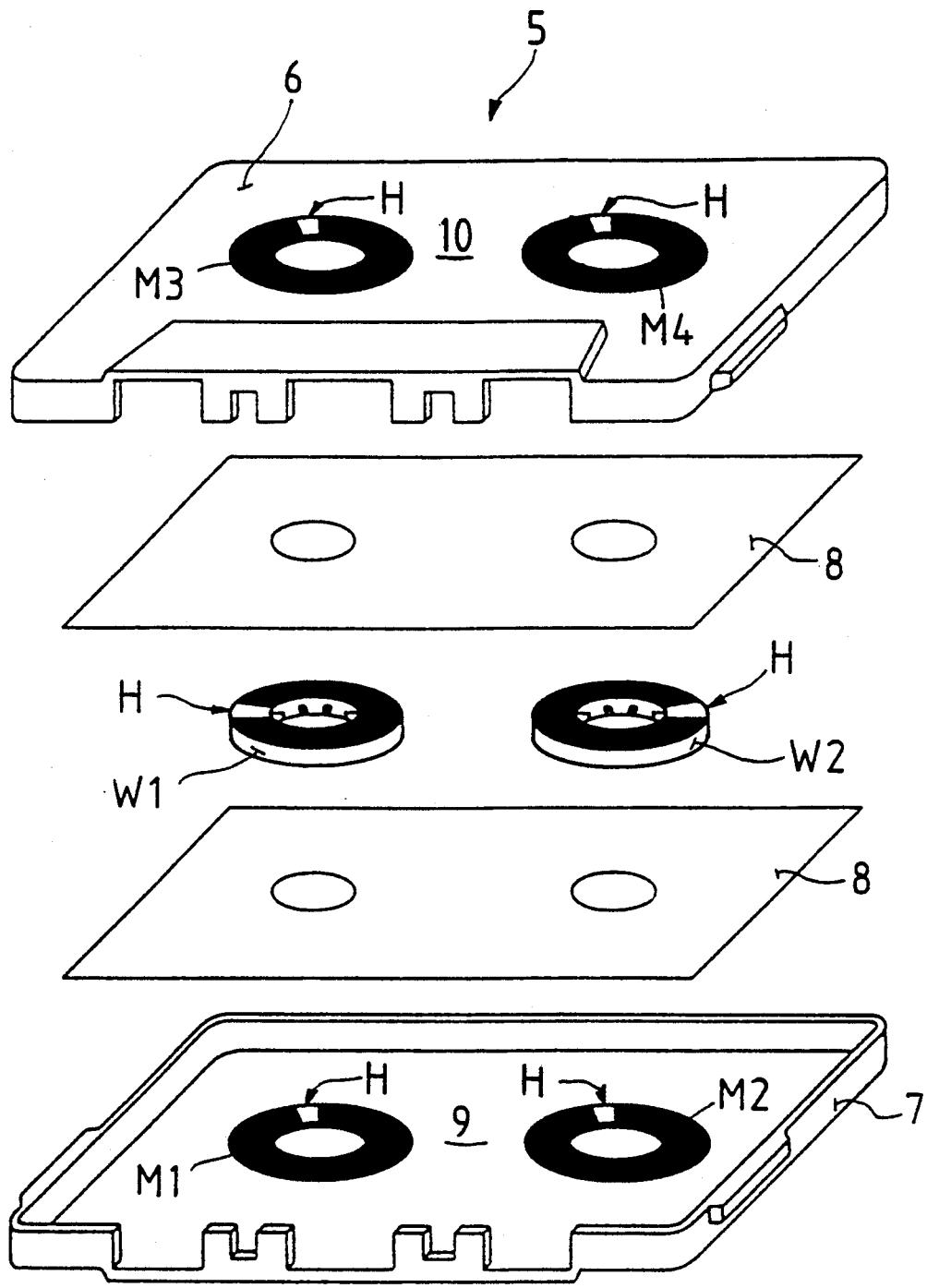

United States Patent [19]
Wolf

[11] Patent Number: 5,255,143
[45] Date of Patent: Oct. 19, 1993

[54] MEANS FOR VISUALIZATION OF ROTARY MOVEMENT IN TAPE CASSETTES

[75] Inventor: Hans J. Wolf, Diefenbach-Sternenfels, Fed. Rep. of Germany

[73] Assignee: BASF Aktiengesellschaft, Ludwigshafen, Fed. Rep. of Germany

[21] Appl. No.: 676,029

[22] Filed: Mar. 27, 1991

[30] Foreign Application Priority Data

Apr. 2, 1990 [DE] Fed. Rep. of Germany ....... 9003809

[51] Int. Cl.$^5$ ............................................. G11B 23/02
[52] U.S. Cl. ..................................... 360/132; 242/199
[58] Field of Search ................ 360/132; 242/197–201

[56] References Cited

U.S. PATENT DOCUMENTS

| | | | |
|---|---|---|---|
| 4,345,540 | 8/1982 | Karmin | 360/93 |
| 4,692,746 | 9/1987 | Budin | 360/132 X |
| 4,712,149 | 12/1987 | Goto | 360/132 |
| 4,781,340 | 11/1988 | Shiba | 360/132 X |
| 4,916,566 | 4/1990 | Urayama | 360/132 |
| 4,926,279 | 5/1990 | Kurashina | 360/132 |
| 4,932,604 | 6/1990 | Maehara et al. | 242/199 |

FOREIGN PATENT DOCUMENTS

| | | |
|---|---|---|
| 0299649 | 7/1988 | European Pat. Off. . |
| 674429 | 5/1991 | Switzerland . |
| 2119752 | 11/1983 | United Kingdom . |

*Primary Examiner*—A. J. Heinz
*Attorney, Agent, or Firm*—Keil & Weinkauf

[57] ABSTRACT

In a tape cassette, a rotary movement of a reel or hub can be visualized in a technical and aesthetic manner by means of a completely or partly transparent cover above and/or below the reel or the hub. Advantageously, the cover contains at least one space and the reel or the hub at least one contrasting pattern, for example with respect to the shape and color of the cover. The pattern/cover combination can be used for all cassettes containing recording media, in which a movement of the recording medium, in particular of a magnetic tape, of a magnetic disk, of a film, of an optical disk, etc., takes place.

23 Claims, 11 Drawing Sheets

FIG.6
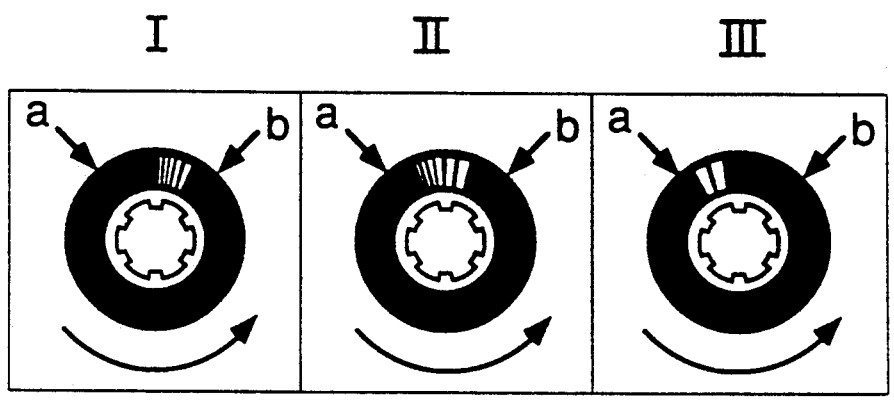
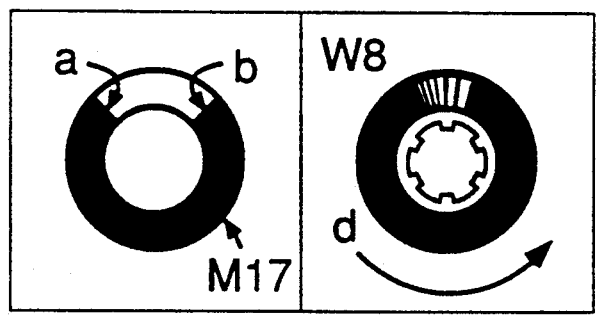
FIG.6B  FIG.6A

FIG.7
I    II    III
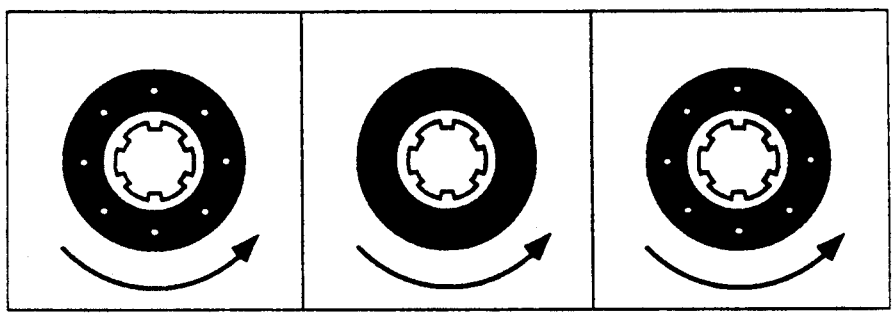
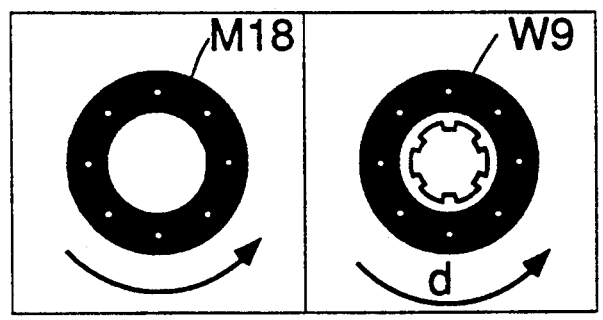
FIG.7B    FIG.7A

FIG. 8
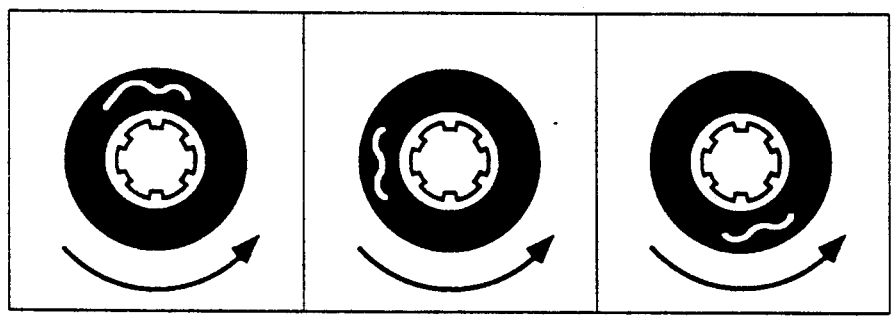
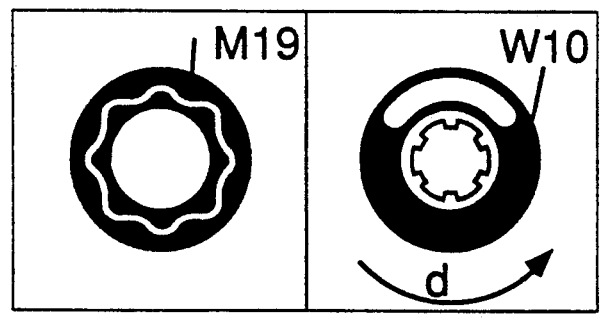
FIG. 8B  FIG. 8A

FIG.9
I    II    III
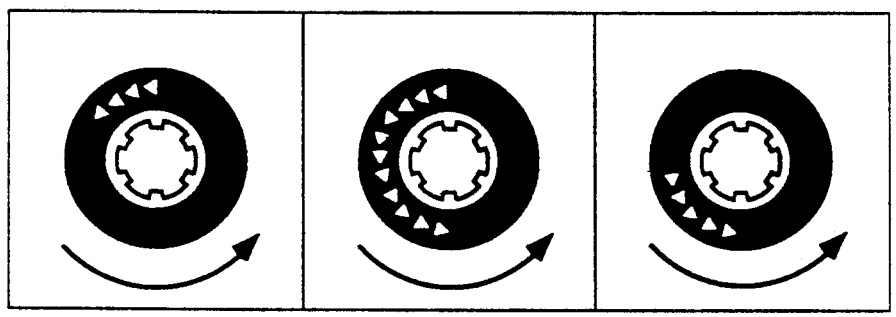
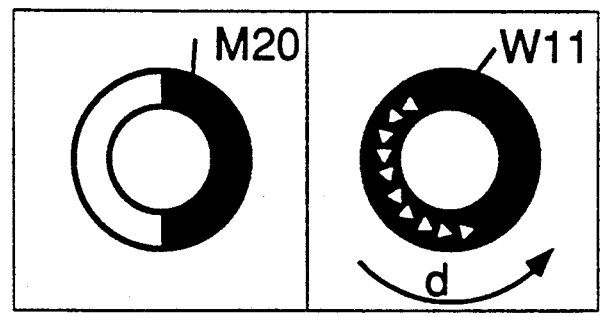
FIG.9B    FIG.9A

FIG.10
I  II  III
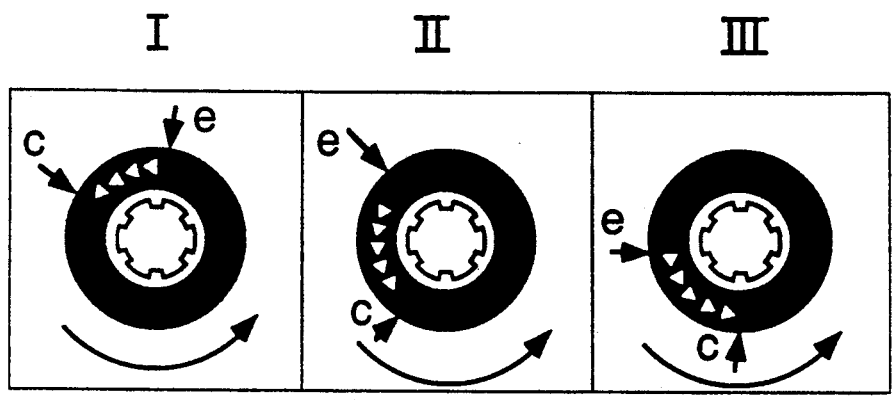
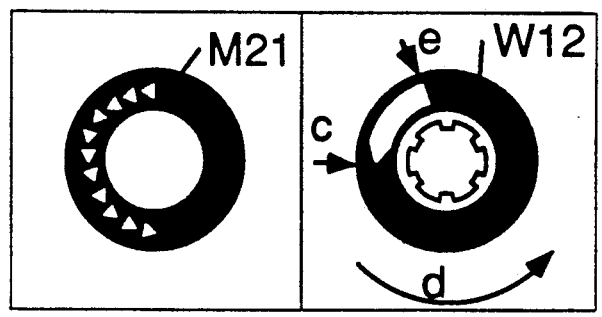
FIG.10B  FIG.10A

FIG.11
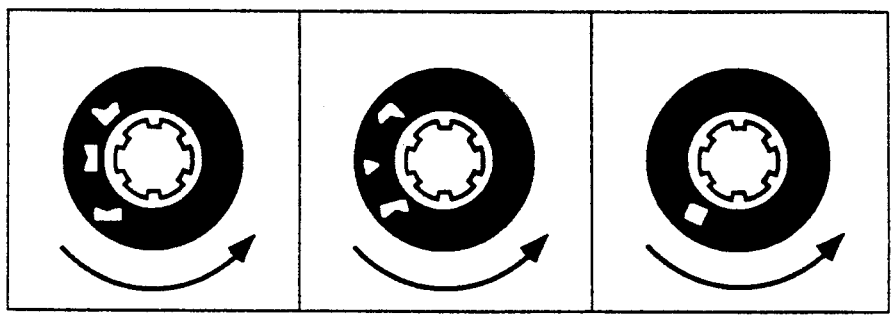
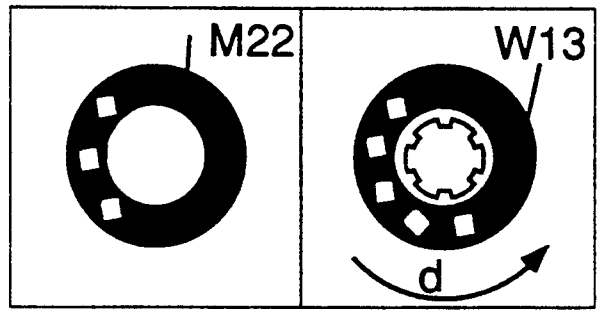
FIG.11B  FIG.11A

FIG.12
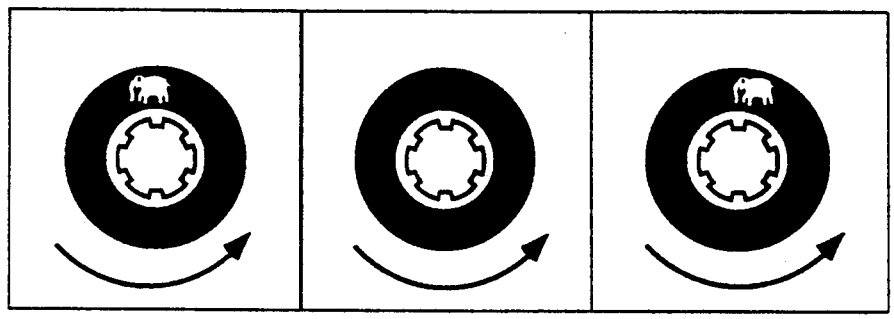
I    II    III
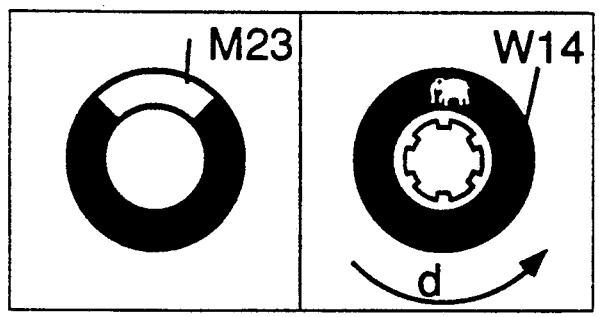
FIG.12B    FIG.12A

MEANS FOR VISUALIZATION OF ROTARY MOVEMENT IN TAPE CASSETTES

The present invention relates to a tape cassette for recording media, in particular a magnetic tape cassette, consisting of two housing halves which enclose at least one rotatable reel and one recording medium wound at least temporarily thereon, at least one of the housing halves being provided with an optical cover.

In the widest sense, a cassette for recording media is any recording medium from film through video and audio tape to punched tape and typewriter ribbons and from video disks to computer disks and diskettes, which is stored predominantly either in a cassette or in another envelope and can be played back inside the cassette or envelope.

The present invention is to be described using the audio cassettes as an example.

In the audio cassettes sector, various methods have been adopted for distinguishing the cassettes of different types, designs and manufacturers from one another. Some methods employed different colors or the surface structures of the cassette housing or other design features, such as window size and arrangement, color and design of the hubs (flangeless reels), color of the leaders, etc.

With regard to the flangeless reels, attempts have already been made to achieve aesthetic differences directly by holes and/or structures in or on the flangeless reels.

A magnetic tape cassette having an apparatus for indicating the unwound tape length is known, a window being arranged in the cassette housing, which window contains visible scale divisions which are provided on otherwise invisible rim elements of the indicating apparatus inside the cassette housing.

It is an object of the present invention to provide a means for displaying or visualizing the revolution of the reel.

We have found that this object is achieved by a tape cassette for recording media, in particular a magnetic tape cassette, consisting of two housing halves which enclose at least one rotatable reel and one recording medium wound at least temporarily thereon, at least one of the housing halves being provided with an optical cover, if the optical cover or covers is or are arranged and formed above and/or below the reel in such a way that parts of the rotating reel are only temporarily visible.

As a result, an optical display dependent on the rotary speed is obtained, from which display it is possible to see, for example, whether uniform or nonuniform rotary movement is taking place.

The reel can of course be in the form of a flanged reel or flangeless reel (hub).

It is advantageous if the cover is partly transparent and nonrotatable.

In a further embodiment, the cover can be provided between that region of the housing halves, in particular of a window region, which is arranged above and/or below the central area of the reel, and the reel.

If desired, the outer contour of the cover can be formed to correspond roughly to the size of the reel central area or of the hub or to be larger or smaller.

This makes it possible to realized various design effects.

Important aesthetic effects can be achieved if the central area of the reel is provided with a pale/dark or color contrast pattern and the cover contains spaces, the color of the cover having a pale/dark or color contrast with respect to the pattern of the reel.

Many possible patterns can be used. Geometric patterns, for example triangle, squares, circular shapes, etc. have proven particularly striking. It is also possible for the pattern to be at least a linear motif and for the space to have at least a corresponding linear form. Furthermore, discontinuous motifs can be realized by an appropriate motif form on the reel and the corresponding form of the space on the cover.

Application of the pattern and of the cover can be achieved by printing, adhesive bonding, 2-color injection molding or painting. On the reel it is also possible to mount a ring having at least one pattern.

In the case of a cassette wall which is injection molded or otherwise provided with color, it is also possible to produce the cover by partially removing the color.

It is also possible to produce the cover by means of at least one colored film, in particular by means of a conventional support liner.

The cover can also be applied by means of an additional cover film, including ones of oval or circular shape. The pattern of the reel can also be provided at least partly on raised or recessed parts of the central area of the reel, since this makes printing of the positive or negative pattern very simple.

In all novel embodiments, the cassette acquires a better utility value through relatively simple means by visualization of the movement of one or both reels and by improved aesthetics and greater distinctiveness compared with other cassettes.

The characteristic feature is very rapidly perceptible in all apparatuses in which the cassettes or recording media are partly or completely visible, since the additional or only movement of the patterns or motifs in the space on the cover is immediately evident.

As a result of the many possible embodiments of the novel tape cassette, it is possible to produce cassettes having different playback times and of different types, designs or manufacturers in a simple manner with characteristic distinguishing features.

The invention is described below with reference to embodiments shown in the drawing.

Figure 2:
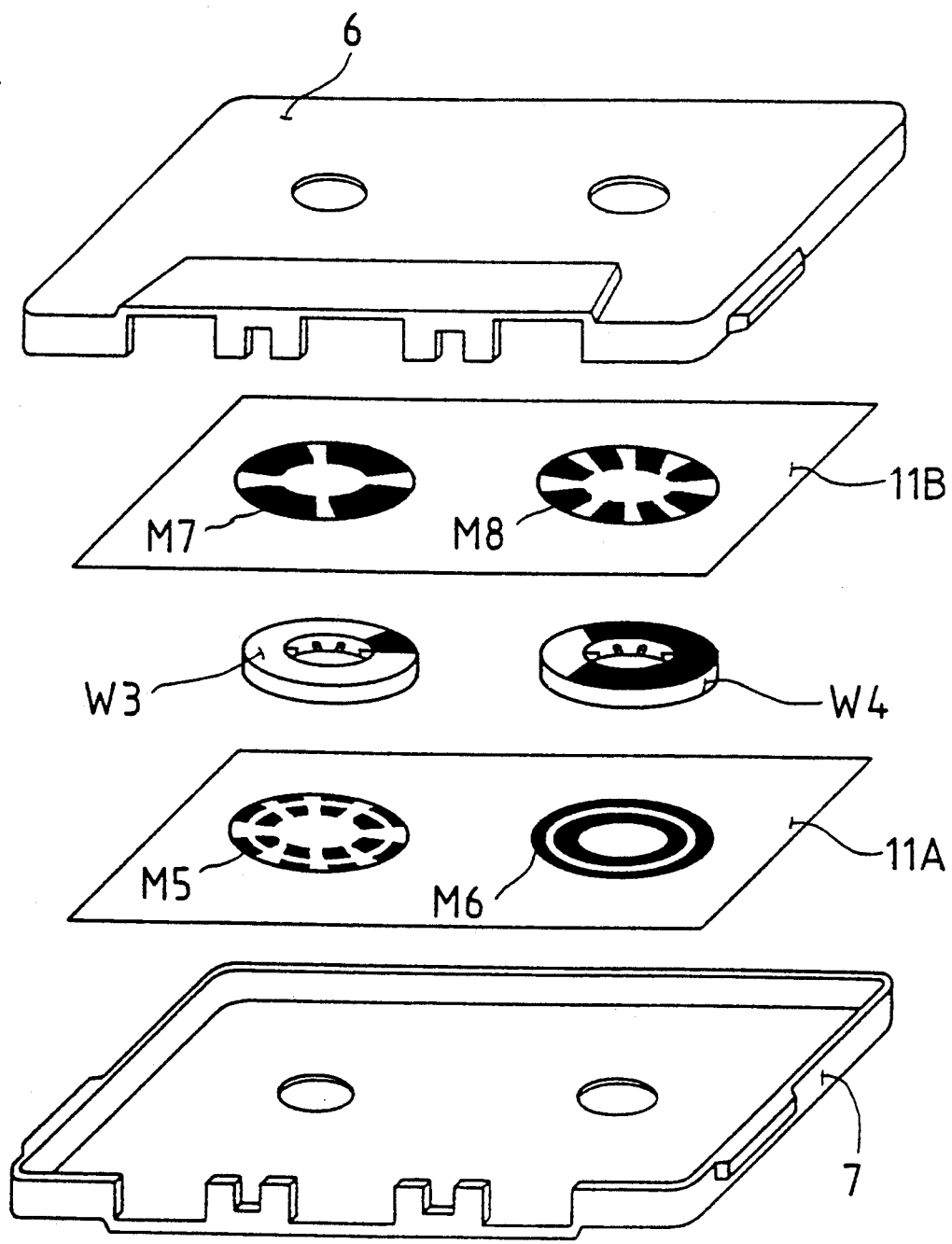
Figure 3:
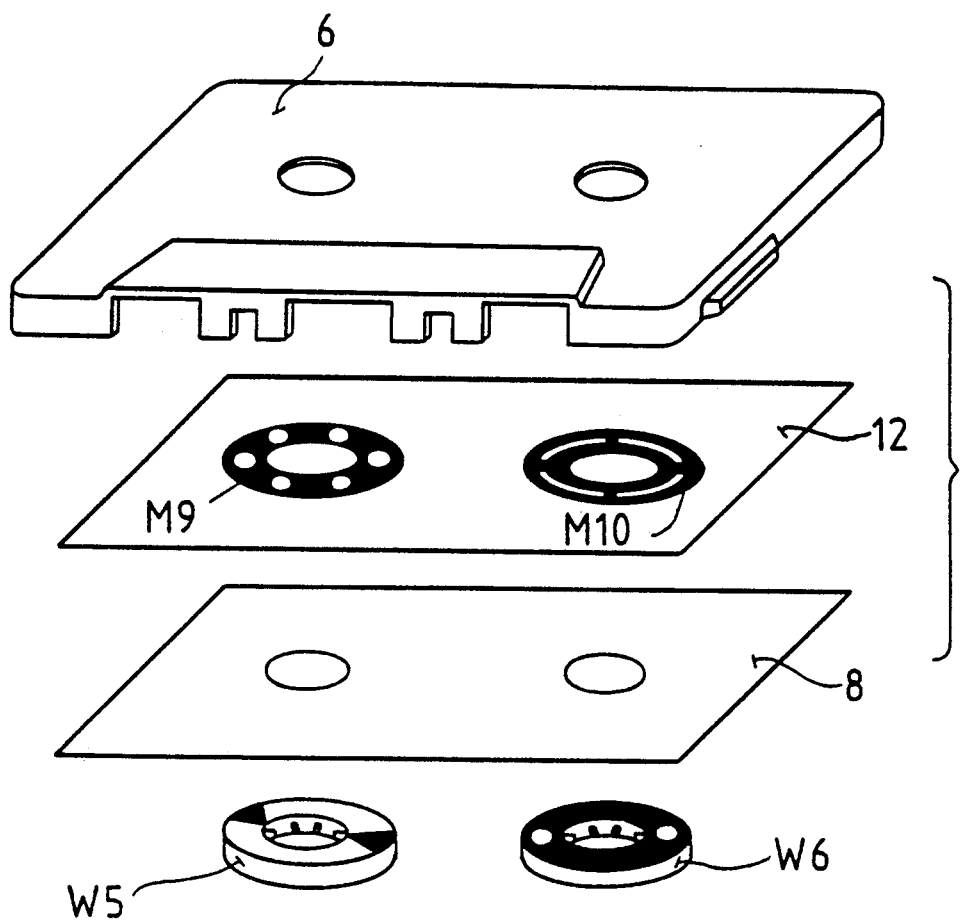
Figure 4A:
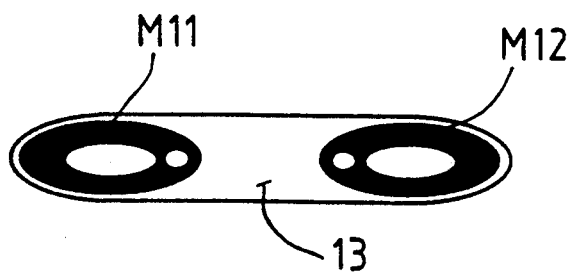
Figure 4B:
Figure 5:
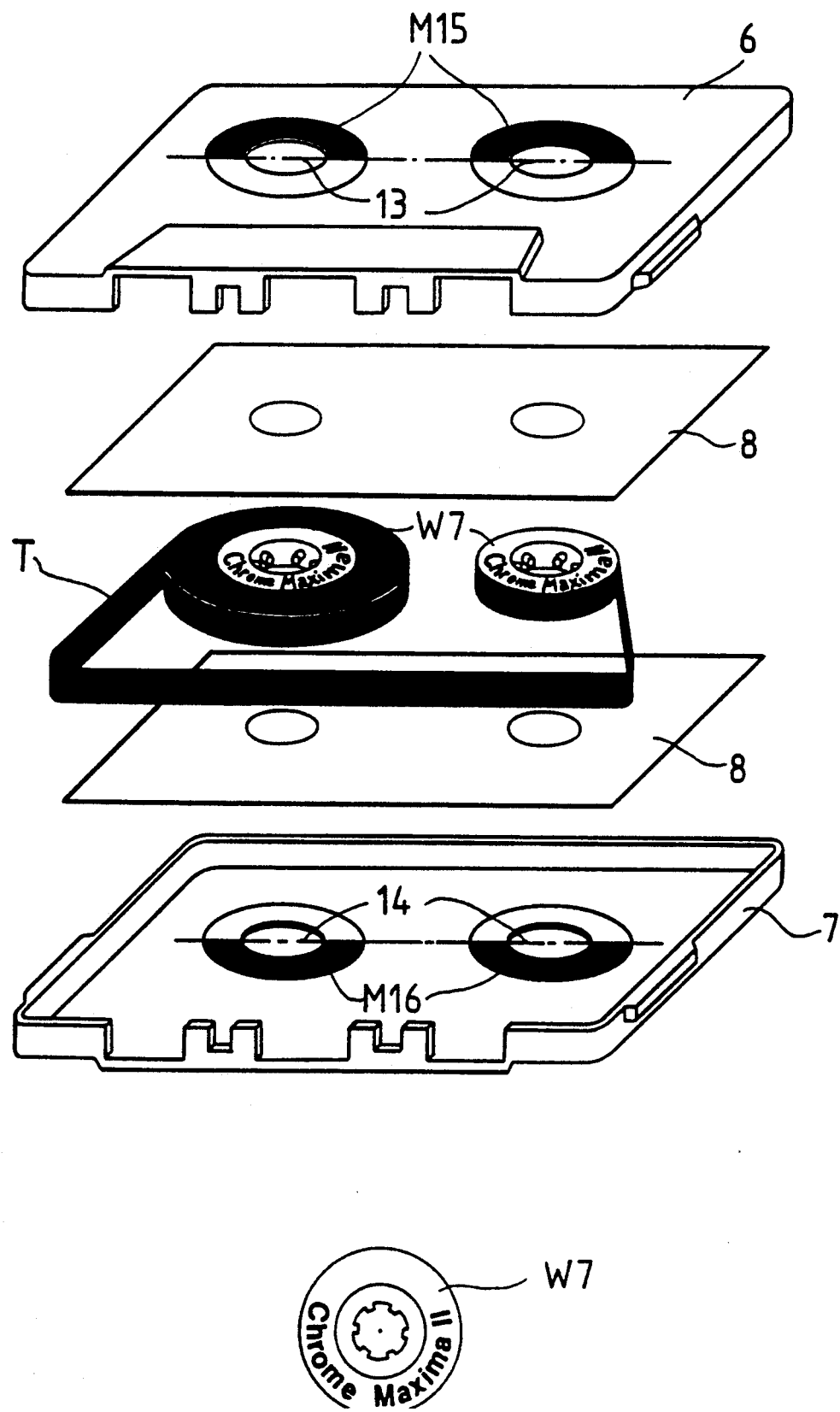

FIG. 1 shows an exploded view of a compact cassette having hubs, support liners and covers on the housing walls, FIG. 2 shows a variant of the cassette in FIG. 1, the covers being provided on the support liners, FIG. 3 shows a variant having a cover film and a support liner on each side of the reels, FIG. 4A shows an oval cover film, FIG. 4B shows two circular cover films, FIG. 5 shows a compact cassette according to FIG. 1 and reels having characteristic features, FIGS. 6A+B show embodiments of a hub and of a cover having sectoral symbols, FIGS. 6, I-III show instantaneous views of the course of movement of the reel under the cover according to FIG. 6, FIGS. 7A+B, I-III show embodiments as in FIG. 6, but with dot symbols, FIGS. 8A+B, I-III show embodiments as in FIG. 6, but with wavy line symbols, FIGS. 9A+B, I-III show embodiments as in FIG. 6, but with triangular symbols, FIGS. 10A+B, I-III show an embodiment as in FIG. 9, but with interchanged symbols on cover and reel, FIGS. 11A+B, I-III show an embodiment as in FIG. 6, but with diamond-shaped spaces and symbols and FIGS. 12A+B, I-III show an embodiment as in FIG. 6, but with an elephant symbol.

FIG. 1 shows a simplified view of a compact cassette 5 having housing halves 6 and 7, rectangular support liners 8 and flangeless hubs, referred to here as hubs W1 and W2. In this example it is assumed that the housing halves consist of transparent or at least partly transparent material, for example of polystyrene. Under this condition, it is necessary to provide covers or masks M1-4 on the bottom and lid walls 9 and 10 of the housing halves 6 and 7, flangeless reels or respectively, in order at least partially to cover the hubs W1 and W2 and to make them visible only temporarily.

In FIG. 1, the hubs W1 and W2 are provided with a symbol or a pattern K and each of the annular covers M1-M4 is provided with a radial pale space H, which can be of the same size or of a different size. When the hubs W1 and W2 perform a rotary movement in the playback mode or rewind mode of the magnetic tape I shown only in FIG. 5, a pale or white flash of the symbol K in each space H of the covers M1-M4 is visible for each complete hub revolution.

In the case of adjacent covers M1 and M2 or M3 and M4, the spaces H can also be provided at radially different points.

If the dark parts of the hubs W and of the covers M are interchanged in a complementary manner with the pale parts (symbols K or spaces H), the effect is a dark or black flash with each hub revolution.

The invention is described below for pale/dark embodiments and effects. However, it is pointed out that all that is important is the possibility of distinguishing between the symbols and covers, and, for the sake of simplicity, the covers should be assumed to be opaque.

Since only the pale/dark contrast is of primary importance, it is also quite possible to use corresponding contrast colors.

For some applications it may also be advantageous to use covers which are not completely opaque, in order to achieve, for example, a particular milky or underwater effect.

The above embodiments for pale/dark or color contrast are also very dependent on the light or lighting conditions at the cassette recorders. However, these conditions can be improved by using light emitting diodes or luminous colors.

To achieve a simple and impressive display, all covers M are of annular shape and have a width which in any case covers the hub W itself, even if an otherwise transparent housing is used. In the drawing, the covers M moreover have a constant ring width, which is also not essential in practice, since particular, for example eccentric, movement sequences can be produced in the case of nonuniform width.

The covers on the cassette housing can be produced in any suitable manner, for example by printing, adhesive bonding or painting a completely or partly transparent cassette wall or by two-color injection molding of the cassette half or halves. If the cassette walls are provided with color, the spaces of the cover can also be formed by removal of color. The hubs can be provided with color or have color removed from them by the same methods. If the hubs have the symbols as raised or recessed parts, application of the color to the remaining areas can also be achieved by applying the color by knife coating, etc.

In the case of hubs, it is also possible to clamp on a sheet or cover bearing the symbols.

FIG. 2 shows the housing halves 6 and 7, support liners 11A and 11B and hubs W3 and W4, the covers M5-M8 in this case being provided directly on the support liners 11. The housing halves 6 and 7 must thus be completely or partly transparent, at least in the annular region above, corresponding to the annular region of the covers M1-M4 in FIG. 1.

The particular symbols of this embodiment are:

M5: a combined ring and radial strip space pattern
M6: a ring space
M7: a cross space
M8: a multiple radial strip space pattern
W3: a dark short contrast sector as a symbol
W4: a dark long contrast sector as a symbol.

In contrast to FIG. 2, in FIG. 3 a conventional support liner 8 and in addition a film 12 preferably having a flat form are provided, on each hub side, as a pure cover film between the cassette halves 6 or 7 and the particular support liner 8.

Particular symbols of this embodiment are:

M9: six circular, pale spaces
M10: four arc sections as contrast spaces
W5: two triangular contrast sectors as symbols
W6: two diagonally arranged pale circular contrast areas as symbols.

The cover film 12, which is rectangular in FIG. 3, can also be in the form of an oval film 13 according to FIG. 4A or in the form of two separate circular films 14A and 14B according to FIG. 4B.

The covers are each in the form of a pale circular space for M11 and M12 and in the form of a square or rectangular window space for M13 and M14, the latter being arranged on common diagonals, in this case on the line connecting the midpoints of the cover films 14A and 14B.

FIG. 5 shows a cassette, likewise having housing halves 6 and 7, and having covers M15 and M16, two support liners 8 and hubs W7. In FIG. 5A, the hub W7 is shown in plan view and contains the inscription BASF ® Chrome Maxima II ®, of which the designations BASF ® and Maxima ® are registered trade marks of BASF Aktiengesellschaft, D-6700 Ludwigshafen.

A tape roll of a magnetic tape T is present on the two hubs W7. The covers M15 and M16 have a semiannular shape, as do the spaces, the line of separation coinciding with the line connecting the midpoints of the housing drive orifices 13 and 14. The semiannular covers are arranged with respect to the hubs W7 in such a way that, when viewed from one side of the cassette, the upper half of the hub W7 is covered and, when viewed from the other side, the lower half of the hub W7 is covered. The inscription is thus only half visible on each side but completely visible when both sides are taken together.

In FIGS. 6 to 10 below, examples of hub symbols and cover embodiments (A, B) are shown and their movement sequence is also described in detail with reference to three instantaneous views (I-III).

FIG. 6

M17 (FIG. 6B): a cover having a quarter sector space

W8 (FIG. 6A): a hub having a serial window symbol, the windows having different widths but the same radial length.

The arrow d denotes the direction of rotation of the hub.

In views I to III, the hub W8 is rotated under the cover M17 (which is indicated by dashed arrows).

The border lines of the cut-out are denoted by a and b.

View I: The two largest windows of the symbol are still covered behind the border line b.

View II: The window series of the symbol is completely between the border lines a and b, ie. visible in the space.

View III: The two largest windows of the symbol are still just visible before disappearing behind border line a.

FIG. 7

M18 (FIG. 7B): a cover having 8 dot-shaped spaces
W9 (FIG. 7A): hub having corresponding 8 dot-shaped windows as symbols.

View I: The dot-shaped spaces (M18) are exactly above the dot-shaped windows (W9) and a dot-shaped pattern is obtained.

View II: The dot-shaped windows (W9) are between the dot-shaped spaces (M18), so that complete covering occurs.

View III: Corresponds to view I. Partial overlap is not shown.

FIG. 8

M19 (FIG. 8B): A space is a closed roughly regular wavy line.

W10 (FIG. 8A): An oval-shaped symbol extends over about 45° as a contrast area.

Views I to III: A sector of the wavy line is continuously visible in the direction of rotation, giving the impression of a moving worm.

FIG. 9

M20 (FIG. 9B) is provided with a semiannular cover (as for M15, M16) but with a vertical line of separation.

W11 (FIG. 9A) is a sequence of triangular symbols arranged in series, as contrast areas.

View II: The complete number of triangular symbols is visible in the space.

View I: Shows the beginning of entry of the first 4 triangular symbols before the position of view II is reached.

View III: Shows, as the end of the triangular symbol sequence, the last 5 triangular symbols after reaching the position of view II.

FIG. 10

M21 (FIG. 10B) corresponds, as a space, to the triangular symbols of hub W11 in FIG. 9.

W12 (FIG. 10A) is an elongated symbol similar in shape and size to the oval-shaped symbol of hub W10 in FIG. 8.

Views I-III: At each of the instants shown, only some of the triangular spaces are visible. A complete illustration of all triangular spaces is possible only by lengthening the elongated symbol, to correspond at least to the length of the triangular shape sequence.

The particular position of the elongated symbol is recognizable in views I-III from arrows c and e, which correspond to its length.

The embodiments and movement sequences described can only illustrate a small number of possibilities. However, it should not be forgotten that visualization or utilization of the rotary movement of the reel is desired, on the one hand to enable the uniformity of reel rotation and hence of tape running to be visualized or, in the case of irregularities, to draw attention to these in good time and finally to combine the two control functions with aesthetic advantages.

In the latter respect, there are no limits to fantasy. It is, for example, entirely possible to allow pieces of ice to fall toward a penguin on the cassette or to be caught by said penguin, said pieces being producible by means of the cover and the rotating hub in suitable form (cf. FIG. 11). It is also possible to arrange running animals (cf. FIG. 12) or pairs of animals following one another (cat and dog) on different diameters of the cover and of the hub.

Assuming the annular form of the cover, it is even possible to visualize irregularities in hub revolution.

It is also possible to change the size of the cover relative to the hub as well as the size of the hub relative to a selected cover.

FIG. 11

M22 (FIG. 11B): contains 3 square spaces in various positions.

W13 (FIG. 11A): shows 5 square symbols.

Views I+II: In each of the instants shown, 3 irregular polygons of different sizes are visible.

View III: A small square is visible.

Together with a suitable additional symbol on the cassette, for example of a penguin, it is possible to create the impression of falling pieces of ice.

FIG. 12

M23 (FIG. 12B): corresponds to M17 (FIG. 6B)
W14 (FIG. 12A): the symbol is a contrasting elephant.

Views I+III: At this instant an elephant is visible.

View II: No elephant is visible at this instant.

By increasing the number of spaces to two or more, more frequent visualization is possible. Instead of the elephant symbol, it is entirely possible to use any other symbol, for example Arabic or Roman number or letter symbols.

We claim:

1. A tape cassette for recording media, consisting of two housing halves which enclose at least one rotatable reel having a central part and one recording medium wound at least temporarily on said reel, at least one of the housing halves being provided with an optical cover and parts of the rotating reel are only temporarily visible at least adjacent to said optical cover, wherein the at least one optical cover is arranged and formed at least vertically above or vertically below the central part of the reel which is provided with at least one optical mark having a color and the optical cover carries a contrast color thereto for forming a plurality of window spaces for uncovering said optical mark which visibly interacts with said optical cover during rotation of the reel for proving various momentarily different optical pictures.

2. A tape cassette as claimed in claim 1, wherein the optical mark consists of a color pattern and the optical cover consists of a contrast pattern and said patterns are pale/dark.

3. A tape cassette as claimed in claim 1, wherein the optical marks consist of geometric shapes.

4. A tape cassette as claimed in claim 1, wherein the optical mark on the central part of the reel is at least a non-straight line and the window spaces on the cover have at least one corresponding shape for visualization of the non-straight line.

5. A tape cassette as claimed in claim 1, wherein the optical mark on the reel(s) is a pattern consisting of any number of discontinuously arranged single forms which is visualized by means of a discontinuous window space in the cover corresponding to the single forms of the pattern.

6. A tape cassette as claimed in claim 1, wherein the optical mark and optical cover are patterns which are applied to the reel and the at least one housing half respectively by a two-color injection molding process.

7. A tape cassette as claimed in claim 1, wherein the optical mark consists of a pattern which is produced by applying a ring to the lateral surfaces of the reel.

8. A tape cassette as claimed in claim 1, wherein the cover, with the exception of the window spaces, is produced by coloring a transparent cassette wall.

9. A tape cassette as claimed in claim 1, wherein the window spaces of the cover are produced by removing color from colored transparent cassette walls.

10. A tape cassette as claimed in claim 1, wherein covering is effected by means of at least one colored film.

11. A tape cassette as claimed in claim 10, wherein the one or more cover films have a circular shape.

12. A tape cassette as claimed in claim 1, wherein the optical marks of the reel are provided at least partly on raised or recessed parts of the central part of the reel.

13. A tape cassette as claimed in claim 18, wherein covering is effected by means of an additional cover film.

14. A tape cassette as claimed in claim 1, wherein covering is effected by means of a support lines.

15. A tape cassette as claimed in claim 1, wherein the cover film has an oval shape.

16. A tape cassette for recording media consisting of two housing halves which enclose two rotatable hubs and one recording medium wound at least temporarily on each hub, at least one of the housing halves being provided with an optical cover and parts of the rotating hubs are only temporarily visible at least adjacent to said optical cover, wherein the at least one optical cover is arranged and formed at least vertically above or vertically below said hubs and each of said hubs is provided with at least one optical mark having a first pattern and said optical cover carries a second pattern containing a plurality of window spaces for uncovering said first pattern of the at least one optical mark associated with a given hub, whereby during rotation of the hubs said first and second patterns visible interact upon each other for providing various momentarily different optical pictures.

17. A tape cassette as claimed in claim 16, wherein the second pattern is in optical contrast to said first pattern.

18. A tape cassette as claimed in claim 16, wherein the first and second patterns are pale/dark.

19. A tape cassette as claimed in claim 16, wherein the first and second patterns are of different color.

20. A tape cassette as claimed in claim 16, wherein the at least one optical mark and the window spaces consist of geometric shapes.

21. A tape cassette as claimed in claim 16, wherein the at least one optical mark on each hub is at least a non-straight line and the pattern on the optical cover has a corresponding window shape for visualization of the non-straight line.

22. A tape cassette as claimed in claim 16, wherein the optical mark on the hub(s) is a pattern of any number of discontinuously arranged single forms which is visualized by means of a discontinuous window space on the cover corresponding to the single forms of said pattern.

23. A tape cassette as claimed in claim 16, wherein the optical mark(s) and the optical cover are patterns which are applied to at least one of the hub(s) and the at least one housing half by a two-color molding process.

* * * * *